Aug. 23, 1932.      O. V. PAYNE      1,873,147
ELECTRICAL WARP STOP MOTION
Filed March 16, 1931      2 Sheets-Sheet 1
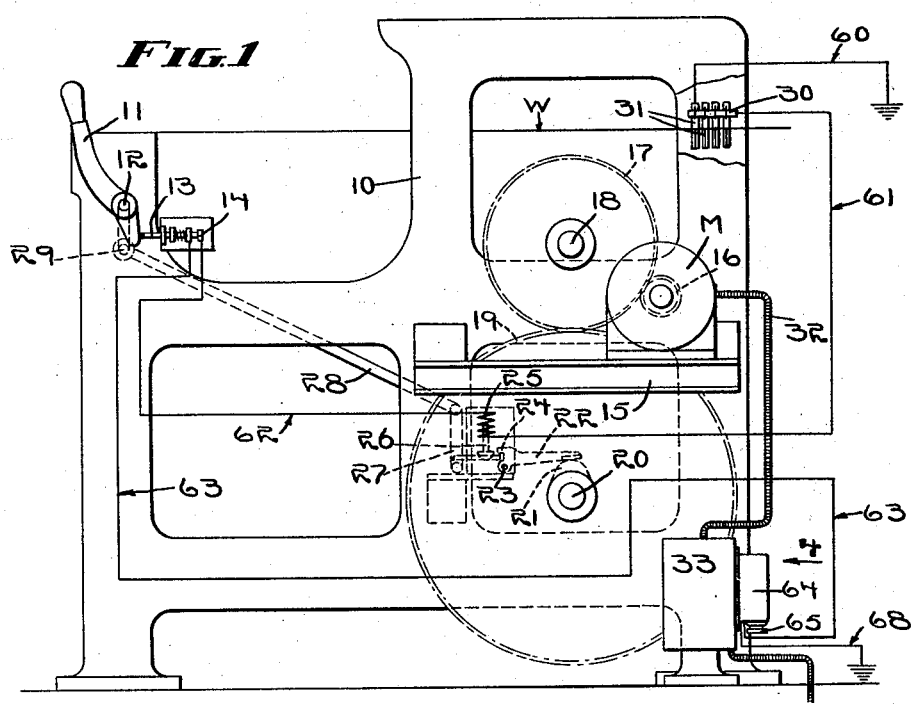
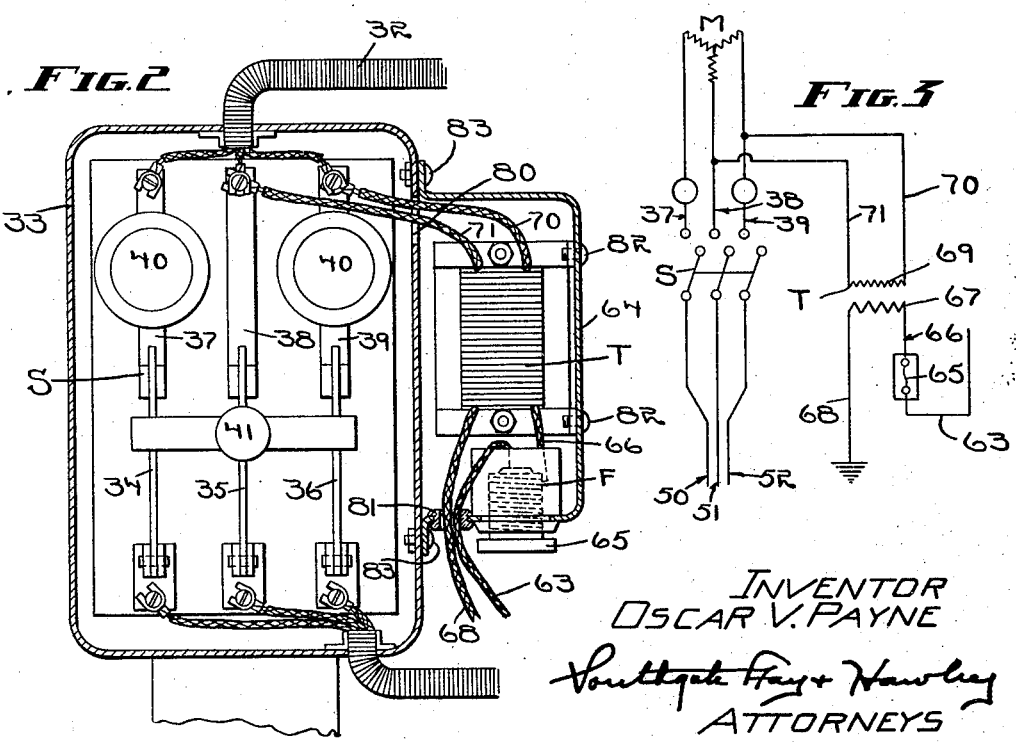
INVENTOR
OSCAR V. PAYNE
ATTORNEYS

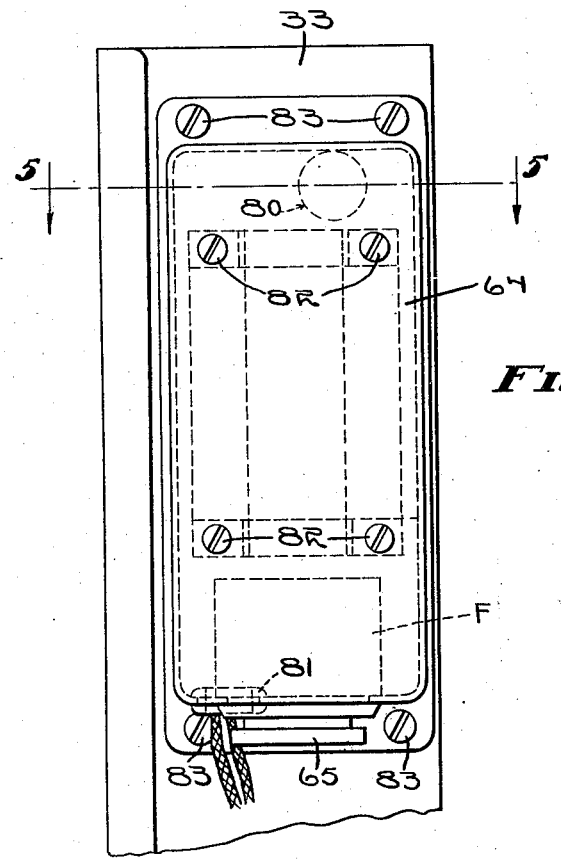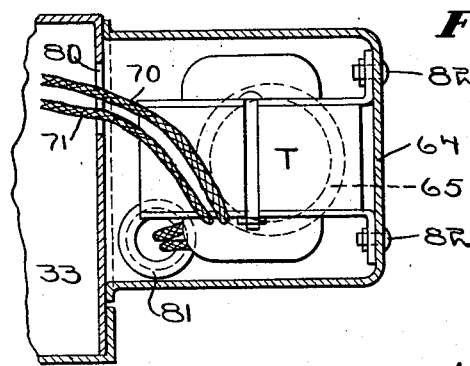

Patented Aug. 23, 1932

1,873,147

UNITED STATES PATENT OFFICE

OSCAR V. PAYNE, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS

ELECTRICAL WARP STOP MOTION

Application filed March 16, 1931. Serial No. 522,820.

This invention relates to improvements in electrical warp stop motions for looms and it is the general object of the invention to provide means whereby the motion may be rendered electrically dead whenever the loom motor is idle.

Present day electrical warp stop motions are usually operated by power derived from the mill wiring, either from the lighting or the power circuits. Where a transformer is employed to reduce the voltage it is desirable that the high potential wires for the transformer be as short as possible and protected. It is an important object of my present invention to provide means for mounting the transformer for the warp stop motion on the box for the switch which controls the loom motor. In this connection it is a feature of my invention to have the high potential side of the transformer together with its wiring located in a closed casing.

It is another object of my present invention to arrange the circuits in such a way that the primary for the transformer will be controlled by the motor switch, so that when the loom is stopped at the close of a working period the transformer, and therefore the warp stop motion, will be dead. It is only when the loom is running that there is any desire to stop it because of warp fault and therefore by the arrangement set forth herein the warp stop motion will be energized only under such conditions as those wherein the desire to stop may arise.

It is a further object of my invention to provide a simple form of housing for the transformer which may readily be applied to a switch box and to arrange the housing with a fuse which is preferably accessible from without the housing so that the latter need not be removed should it be necessary to replace the fuse.

As set forth herein my invention has been shown in connection with a three-phase motor such as is customarily employed on textile machinery and the primary of the transformer is connected across two of the wires of the system.

With these and other objects in view which will appear as the description proceeds, my invention resides in the combination and arrangement of parts hereinafter described and set forth in the claims.

In the accompanying drawings wherein a convenient embodiment of my invention is set forth, Fig. 1 is a side elevation of a loom having my invention applied thereto, Fig. 2 is a vertical transverse section through the switch box and transformer housing shown in Fig. 1, Fig. 3 is a diagrammatic view of the circuits, Fig. 4 is an enlarged rear elevation taken in the direction of arrow 4, Fig. 1, and Fig. 5 is a section along line 5—5 of Fig. 4.

Referring to Fig. 1, I have shown a loom 10 having a shipper handle 11 and shipper shaft 12. A switch is set forth comprising a spring actuated contact 13 and a fixed contact 14 which engages the other contact when the shipper handle is in running position shown in Fig. 1.

A motor bracket 15 secured to the loom frame supports the motor M which has a pinion 16 meshing with a driving gear 17. The latter drives the top or crank shaft 18 and meshes with the lower gear 19 fast on the bottom shaft 20.

A cam 21 on the bottom shaft oscillates an actuator lever 22 movable about a center 23 and having a thrust arm 24. A solenoid 25 controls an armature 26 which is normally out of the path of the thrust arm and is operatively connected to a pivoted lever 27. The latter is connected by a link 28 to the shipper handle, as at 29. A conventional form of warp stop motion designated at 30 may be supported by the loom frame and comprises several banks of drop wires 31 supported on the warp W.

The motor is preferably of the three-phase type and is supplied by current through a triple conductor designated at 32. As shown particularly in Fig. 2 this conductor leads from the top of a switch box 33 in which is mounted a switch S having three insulated blades 34, 35 and 36 adapted for electrical connection with bars 37, 38 and 39, respectively. The bars 37 and 39 may if desired be connected with circuit breakers 40, and the bars are connected at their upper ends to the strands of the triple conductor as set forth in Fig. 2. A handle 41 affords means for throwing the switch so as to connect all the terminals with their respective bars. The circuit shown in Fig. 3 sets forth the three feed lines 50, 51 and 52 of a three-phase circuit and suggests how a closing of the switch will connect these wires with the motor M.

The matter thus far described is of the usual construction and forms no part of my present invention, the warp stop motion operating to permit continued operation of the loom so long as all the warp threads are tight, the armature 26 remaining below the path of the thrust arm 24 as the latter rocks back and forth under influence of the cam 21 during normal loom operation.

In carrying my invention into effect I may connect one side of the warp stop motion 30 to the ground by means of a wire 60 and may connect the other side to the solenoid 25 by means of a wire 61. A second wire 62 connects the solenoid with the switch device 14, and another wire 63 leads from the switch 14 into a casing 64 mounted on one of the walls of the switch box 33. A fuse block F in which is screwed an ordinary plug fuse 65 is connected to the wire 63 while the other side of said fuse block is connected by means of wire 66 to the secondary 67 of a transformer T. The other side of the secondary is connected by means of wire 68 to the ground. In order that the transformer may be energized I connect the primary 69 thereof by means of wires 70 and 71, respectively, to bars 39 and 38, respectively.

Prior to operation of the loom the switch S will be opened, as suggested in Fig. 3, so that the bars 37, 38 and 39 are dead. Under this condition a primary 69 will also be dead so that all of the apparatus electrically connected to the secondary of the transformer will be deenergized. This means that all electrical mechanism lying outside the casing 64 will be electrically dead. When it is desired to start the loom the switch S will be closed, whereupon current will flow through the windings of the motor M to set the latter in rotation. Current will also flow through the primary 69, but the circuit external to the casing 64 will be broken because the switch 14 will be open.

When the shipper handle is moved forwardly to start the loom switch 14 will be closed, whereupon the warp stop motion 30 will be energized and effective upon warp fault to close the circuit including the solenoid 25. The latter will thereupon lift the armature 26 into the path of the thrust arm 24 and upon the next rising movement of the cam 21 the lever 27 will be rocked to the left to move the shipper handle to loom stopping position.

By referring to Fig. 2 it will be seen that the casing 33 has an opening 80 therein through which the wires 70 and 71 pass to the primary of the transformer, and it will also be seen that the fuse block F is held to a portion of the casing 64 which is preferably on the under side thereof so that the accumulation of lint may be reduced to a minimum. The wires 63 and 68 may be led through a bushing 81 in the bottom of the casing 64. By means of screws 82 the transformer may be secured to the casing, and the latter may be held to the switch box by means of other screws 83.

From the foregoing it will be seen that I have arranged the circuits and source of energy for them so that no part of the electrical equipment external to the switch box or casing 64 can be energized unless the switch S is closed. It will also be seen that the casing, together with the transformer and fuse block which it supports, can be applied very readily to the switch box in such a way as to permit the relatively high voltage wires 70 and 71 to be housed entirely within the switch box and casing. If for any reason the current flowing in the stop motion circuit should become excessive the fuse 65 will be blown, but it can be readily replaced without removing the casing or requiring the operator to get inside either the switch box 33 or the casing 64. The arrangement is such that the casing 64 may be readily applied to existing switch boxes.

Having thus described my invention it will be seen that changes and modifications may be made therein by those skilled in the art without departing from the spirit and scope of the invention and I do not wish to be limited to the details herein disclosed, but what I claim is:

1. In a loom having an electric driving motor and an electrical warp stop motion, a pair of communicating casings, a motor switch located in one casing, a transformer located in the other casing, electrical connections extending from the transformer to the switch, and feed wires for the warp stop motion leading from one of the casings.

2. In a loom having an electric driving motor and an electric warp stop motion, a motor switch having one side normally alive and the other side dead when the switch is open, a transformer having a primary and a secondary, means to connect the primary to that part of the switch which is dead when the switch is open, and electric feed wires from the secondary of the transformer for the warp stop motion.

3. In a loom having an electric driving motor and an electric warp stop motion, a motor switch having one side normally alive and the other side dead when the switch is open, a transformer having a primary and a secondary, means to connect the primary to that part of the switch which is dead when the switch is open, electric feed wires from the secondary of the transformer for the warp stop motion, and a pair of communicating housings, one for the switch and one for the transformer, the connection between the switch and the primary of the transformer being located entirely within the housings.

4. In a loom having an electric driving motor and an electric warp stop motion, a switch box, a motor switch located in the box and having a side normally alive and a second side to be rendered alive when the switch is closed, a casing supported by the box and communicating with the latter, a transformer located in the casing, transformer energizing wires from the switch to the primary of the transformer, and transformer wires leading from the casing to supply current for the warp stop motion.

5. In a loom having an electric driving motor and an electric warp stop motion, a pair of connected housings, a motor switch located in one of the housings, a transformer located in the other housing, electric connections between the switch and the transformer located entirely within the housings, and electric connections between the transformer and the electric warp stop motion.

6. In a loom having an electric driving motor and an electric warp stop motion, a circuit closing switch for the motor, a box to inclose said switch, a casing supported by a part of the box and communicating with the interior of the latter, a transformer supported by and located within the casing, a fuse supported by and accessible from a point without the casing, feed wires extending from the transformer to supply current for the warp stop motion, the fuse being connected to one of said wires, and electrical connections between the switch and transformer extending from the box into the casing.

7. In a loom having an electric driving motor and an electric warp stop motion, a circuit closing switch for the motor, a box to inclose said switch, a casing supported by a part of the box and communicating with the interior of the latter, a transformer supported by and located within the casing, a fuse member supported by and accessible from a point without the casing, feed wires extending from the transformer to supply current for the warp stop motion, the fuse being connected to one of said feed wires, said fuse member comprising a block mounted on the one side of the casing and a plug screwed into the block and accessible from the outside of said casing, and electrical connections between the switch and transformer extending from the box into the casing.

In testimony whereof I have hereunto affixed my signature.

OSCAR V. PAYNE.